No. 680,680. Patented Aug. 20, 1901.
F. S. ARMSTRONG, M. C. WEAVER & M. A. BARBER.
TRANSFERABLE CLAMP LAMP BRACKET.
(Application filed Nov. 22, 1900.)
(No Model.)
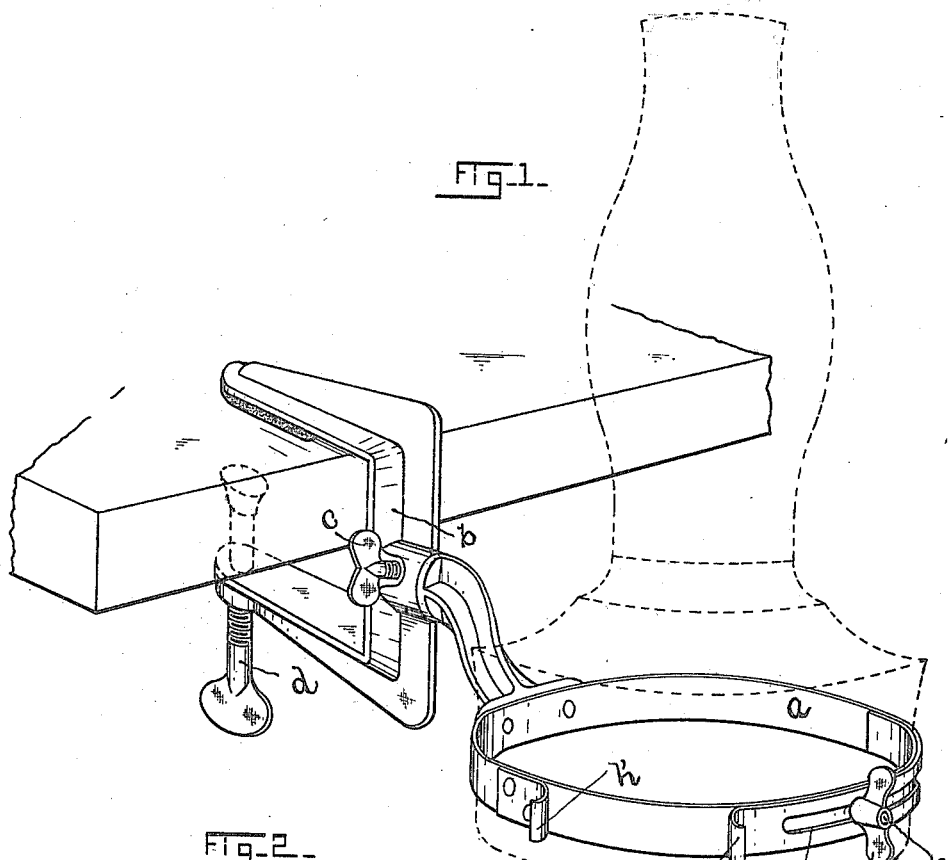
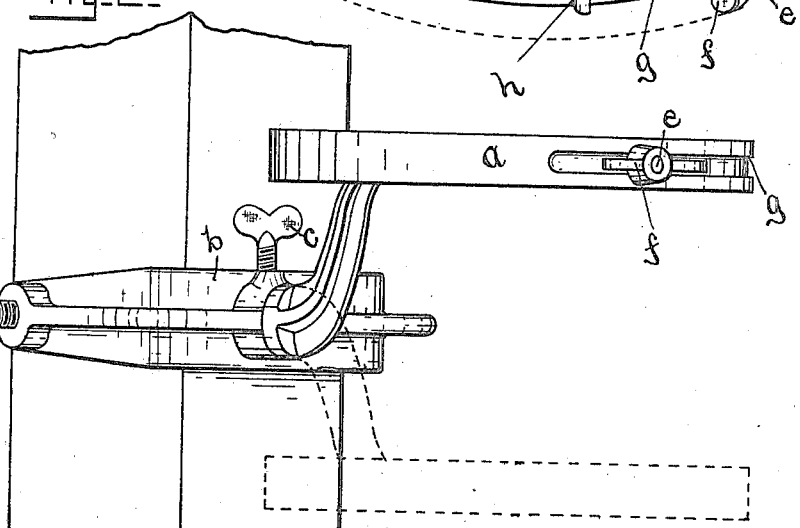

United States Patent Office.

FREDERICK S. ARMSTRONG, OF FRANKLIN, CONNECTICUT, AND MATILDA C. WEAVER AND MABEL A. BARBER, OF NORTH ATTLEBORO, MASSACHUSETTS.

TRANSFERABLE CLAMP LAMP-BRACKET.

SPECIFICATION forming part of Letters Patent No. 680,680, dated August 20, 1901.

Application filed November 22, 1900. Serial No. 37,366. (No model.)

*To all whom it may concern:*

Be it known that we, FREDERICK S. ARMSTRONG, of Franklin, New London county, State of Connecticut, and MATILDA C. WEAVER and MABEL A. BARBER, of North Attleboro, Bristol county, State of Massachusetts, citizens of the United States, have invented a new and useful Invention in Transferable Clamp Lamp-Brackets, of which the following is a specification, reference being had to the accompanying drawings.

In the drawings, Figure 1 is a perspective view of our newly-invented bracket and shows the same as attached to a bench or table, and Fig. 2 illustrates the said bracket as attached to a joist or post.

Our invention consists of a device for holding lamps on sewing-machines, shelves, tables, benches, &c., by means of a clamp, to which almost any lamp or lantern can be attached by means of an adjustable steel rim $a$, swiveled to a clamp $b$ by means of a set-screw $c$, and has for its object to secure a lamp firmly to a sewing-machine or any object upon which it is impossible or unsafe to set a lamp. The clamp $b$ works with a thumb-screw $d$, and said clamp being swiveled to the adjustable steel rim $a$ may be adjusted at any angle relative to said steel rim to enable the attaching of our device either to a horizontal or perpendicular support or in any angle therebetween.

The steel rim $a$ consists of a flexible band whose ends are overlapped, and such overlapping ends are adjustably secured together by means of a threaded bolt $e$ and thumb-nut $f$, the former being secured in one of such overlapping ends and passing through a slot $g$ in the companion end and receiving the said thumb-nut to retain the said ends from slipping upon each other after their adjustment to construct a ring of proper diameter to clamp a lamp which is to be supported.

The rim or band $a$ when expanded or contracted preserves at all times a perfect circular form and provides a large range of adjustment, whereby lamps of different sizes may be securely supported.

The reference-letters $h$ $h'$ denote finger-rests by means of which the adjustment of the steel rim $a$ may be readily attained.

When it is desired to contract the band $a$, it may be easily and conveniently done by placing a thumb and forefinger on the finger-rests $h$ $h'$, respectively, and bringing the said rests together until the desired circle is formed by the flexible band. The overlapping ends of the band are then securely clamped together by the bolt $e$ and nut $f$, and a ring is thus provided that is practically as rigid as if formed of a single endless metallic band.

Having thus described our invention, we claim—

In a bracket, in combination, a clamp, a lamp-support consisting of a flexible band and means for securing together the overlapping ends of said band, and an arm secured to said band and swiveled in the said bracket; the said flexible band being formed with radially-projecting finger-rests $h, h'$, substantially as specified.

In testimony whereof we have signed our names to this specification in the presence of the subscribing witnesses.

FREDK. S. ARMSTRONG.
    MATILDA C. WEAVER.
    MABEL A. BARBER.

Witnesses as to signature of Frederick S. Armstrong:
  FRANK H. ALLEN,
  MAY F. RITCHIE.

Witnesses as to signatures of Matilda C. Weaver and Mabel A. Barber:
  FRED B. BYRAM,
  M. E. MCLEOD.